US008952257B2

(12) United States Patent
Dais et al.

(10) Patent No.: US 8,952,257 B2

(45) Date of Patent: Feb. 10, 2015

(54) ELECTRICAL CONDUCTOR FOR A HIGH-CURRENT BUSHING

(75) Inventors: Ansgar Dais, Dietikon (CH); Michael Christen, Ennetbuergen (CH)

(73) Assignee: ABB Technology AG, Zurich (CH)

( * ) Notice: Subject to any disclaimer, the term of this patent is extended or adjusted under 35 U.S.C. 154(b) by 611 days.

(21) Appl. No.: 12/786,034

(22) Filed: May 24, 2010

(65) Prior Publication Data

US 2010/0294562 A1 Nov. 25, 2010

(30) Foreign Application Priority Data

May 25, 2009 (EP) .................................... 09161011

(51) Int. Cl.

*H01B 17/26* (2006.01)
*H01F 27/04* (2006.01)
*H01B 17/20* (2006.01)
*H01B 17/42* (2006.01)
(Continued)

(52) U.S. Cl.

CPC ................ *H01F 27/04* (2013.01); *H01F 27/12* (2013.01)
USPC ................... 174/142; 174/140 R; 174/152 R; 174/167; 174/73.1; 174/80

(58) Field of Classification Search

USPC .......... 174/139, 148, 167, 142, 137 R, 140 R, 174/140 CR, 145, 73.1, 80, 81, 74 R, 14 R, 174/14 C, 14 CR, 102 SC, 105 SC, 106 SC, 174/110 SC, 11 S, 73 SC, 128.1, 128.2, 174/128 F, 152 G, 152 R, 153 G, 209, 75 R, 174/75 D, 135, 144, 141 R, 140 H, 11 BH, 174/12 BH, 19, 127, 14 BH, 143, 650, 18, 174/77 R, 76, DIG. 8, 31 R; 385/138; 337/202; 428/389, 416, 418, 450, 463; 423/622; 523/459; 524/432; 264/230; 16/2.1; 336/174, 70, 94; 248/56; 439/604, 587, 274, 275

See application file for complete search history.

(56) References Cited

U.S. PATENT DOCUMENTS 1,876,581 A * 9/1932 Austin ...................... 174/153 R
2,878,304 A * 3/1959 Mezzack ....................... 174/167
(Continued)

FOREIGN PATENT DOCUMENTS

DE 76 40 214 U1 5/1982
EP 331084 A2 * 9/1989

OTHER PUBLICATIONS

European Search Report for EP 09161011.3 dated Oct. 12, 2009.
(Continued)

*Primary Examiner* — Hoa C Nguyen
*Assistant Examiner* — Binh Tran
(74) *Attorney, Agent, or Firm* — Buchanan Ingersoll & Rooney PC

(57) ABSTRACT

An electrical conductor carries a rated current in a high-current bushing of a transformer. The electrical conductor includes a conductor piece which extends along an axis and has a cylindrical envelope surface, a first electrical connection, and a second electrical connection. The first electrical connection has two contact surfaces which are aligned parallel to one another. Electrical losses of the electrical conductor are kept low, with a compact design. This is achieved, in part, because the second electrical connection is connected without a joint to the conductor piece, and the first electrical connection is hollow and, at right angles to the axis, has an oval profile with two longitudinal faces which form the two contact surfaces. In addition, a hollow electrical conductor section is arranged between the first electrical connection and the conductor piece, connects the first electrical connection to the conductor piece, and forms a smooth transition from the two contact surfaces of the first electrical connection to the envelope surface of the conductor piece.

27 Claims, 2 Drawing Sheets

(51) Int. Cl.

| | |
|---|---|
| *H01B 17/46* | (2006.01) |
| *H01B 17/58* | (2006.01) |
| *H02G 15/00* | (2006.01) |
| *H02G 15/02* | (2006.01) |
| *H02G 15/08* | (2006.01) |
| *H01F 27/12* | (2006.01) |

(56) References Cited

U.S. PATENT DOCUMENTS

| | | | | | |
|---|---|---|---|---|---|
| 3,471,816 | A | * | 10/1969 | Giegerich | 337/195 |
| 3,602,629 | A | * | 8/1971 | Friedrich et al. | 174/15.3 |
| 3,626,079 | A | * | 12/1971 | Keen et al. | 174/15.3 |
| 2008/0210455 | A1 | | 9/2008 | Pollack et al. | |

OTHER PUBLICATIONS

ABB Power Technologies AB, “Technische Anleitung—Transformatordurchführungen Typ GOH”, Internet citation, Apr. 15, 2000, pp. 1-11, XP008112329.

Micafil AG, “Heavy Current Bushings for Transformers”, RTXF, pp. 1-8, Company Document D 4317.

* cited by examiner

ELECTRICAL CONDUCTOR FOR A HIGH-CURRENT BUSHING

RELATED APPLICATIONS

This application claims priority under 35 U.S.C. §119 to European Patent Application No. 09161011.3 filed in Europe on May 25, 2009, the entire content of which is hereby incorporated by reference in its entirety.

FIELD

The present disclosure relates to an electrical conductor, to a high-current bushing having an electrical conductor, and to a method of producing the high-current bushing.

BACKGROUND INFORMATION

High-current bushings are used in power station transformers and are located in the current path between the generator and the primary windings of the transformer, in a generator outgoer, which is generally encapsulated and is loaded with rated currents of up to 40 kA at a comparatively low rated voltage of up to 52 kV. Because of the low dielectric load and the high thermal load, high-current bushings have a relatively short electrical conductor with a large diameter. Heat produced by electrical losses in the electrical conductor of the bushing is therefore quickly passed to its two ends, which are each in the form of an electrical connection. A first of the two electrical connections is located in the oil of the transformer, and is connected to the primary winding of the transformer. As specified by the transformer manufacturers, the first electrical connection has two contact surfaces which are aligned parallel to one another. The second electrical connection is in general located in the air-filled encapsulation of the generator outgoer, and is connected to a current-carrying conductor of the outgoer.

The rated current load capacity of the high-current bushings is determined substantially by the comparatively high temperatures which occur at the electrical connections and by the maximum permissible temperature of the insulating material used in the bushing.

An electrical conductor of the type mentioned initially is used in a transformer bushing of the GOH type, and is described in the Technical Instruction 1ZSE 2750-107 de, Rev 1, 2000-04-15, issued by ABB Power Technologies AB Components, 77180 Ludvika/Sweden. This electrical conductor contains a stiff aluminum bolt. An electrical connection and cooling elements are milled into a first end of the bolt, which is passed into the oil of the transformer, with the electrical connection having two contact surfaces which are aligned parallel to one another. The second end of the bolt is guided in air and is equipped with four drilled flat connections, which are welded to the bolt.

An electrical conductor for a high-current bushing of the RTXF type, which can be used in transformers, is described in a Company Document D 4317, issued by Micafil AG, Zürich/Switzerland. This electrical conductor is tubular and contains electrical connections which are arranged at both ends of the tube. The electrical connections are in the form of plates and are held on two end plates, which close the two ends of the tube.

Known electrical conductors contain a plurality of current-carrying parts which are connected to one another by welding or soldering. Joints are therefore located in a current path which extends between the two electrical connections, and such joints increase the electrical resistance in the current path, thereby contributing to an increase in electrical losses.

SUMMARY

An exemplary embodiment provides an electrical conductor for a high-current bushing. The exemplary electrical conductor comprises a conductor piece having a first end and a second end, and extending along an axis. The conductor piece includes (i) a cylindrical envelope surface, (ii) a first electrical connection being connected without a joint to the first end of the conductor piece and having two contact surfaces which are aligned parallel to one another, and (iii) a second electrical connection being connected without a joint to the second end of the conductor piece. The first electrical connection is hollow and, at right angles to the axis, has an oval profile with two longitudinal faces which form the two contact surfaces. The electrical conductor further includes a hollow electrical conductor section which is arranged between the first electrical connection and the first end of the conductor piece, connects the first electrical connection to the conductor piece, and forms a smooth transition from the two contact surfaces of the first electrical connection to the envelope surface of the conductor piece.

An exemplary embodiment provides a method for producing a high-current bushing having an electrical conductor. The electrical conductor includes a conductor piece having a first end and a second end, and extending along an axis, the conductor piece including (i) a cylindrical envelope surface, (ii) a first electrical connection being connected without a joint to the first end of the conductor piece and having two contact surfaces which are aligned parallel to one another, and (iii) a second electrical connection being connected without a joint to the second end of the conductor piece, wherein the first electrical connection is hollow and, at right angles to the axis, has an oval profile with two longitudinal faces which form the two contact surfaces. The electrical conductor also includes a hollow electrical conductor section which is arranged between the first electrical connection and the first end of the conductor piece, connects the first electrical connection to the conductor piece, and forms a smooth transition from the two contact surfaces of the first electrical connection to the envelope surface of the conductor piece. The high-current bushing includes (i) a first mounting ring, which constitutes a holder for prestressed compression springs and is held on the electrical conductor to surround the electrical conductor in a coaxial arrangement by a hollow-cylindrical field control body, which is supported on the prestressed compression springs, (ii) a mounting flange which is supported on the field control body, (iii) an insulator which is supported on the mounting flange, and (iv) a mounting ring which supports the insulator and is connected to the electrical conductor with a force fit, the mounting ring being formed into the hollow electrical conductor section and has axially aligned pins for guiding the compression springs. The exemplary method includes: plugging the compression springs onto the axially aligned pins, so that a supporting ring is pushed onto the electrical conductor from above and is mounted on ends, which are free at the top, of the compression springs; pushing the sealing rings, the field control body, the mounting flange, the insulator and the second mounting ring are pushed onto the electrical conductor; and forming a stack by prestressing a force acting on the second mounting ring; and connecting the second mounting ring to the electrical conductor with a force fit, while maintaining the prestressing force.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
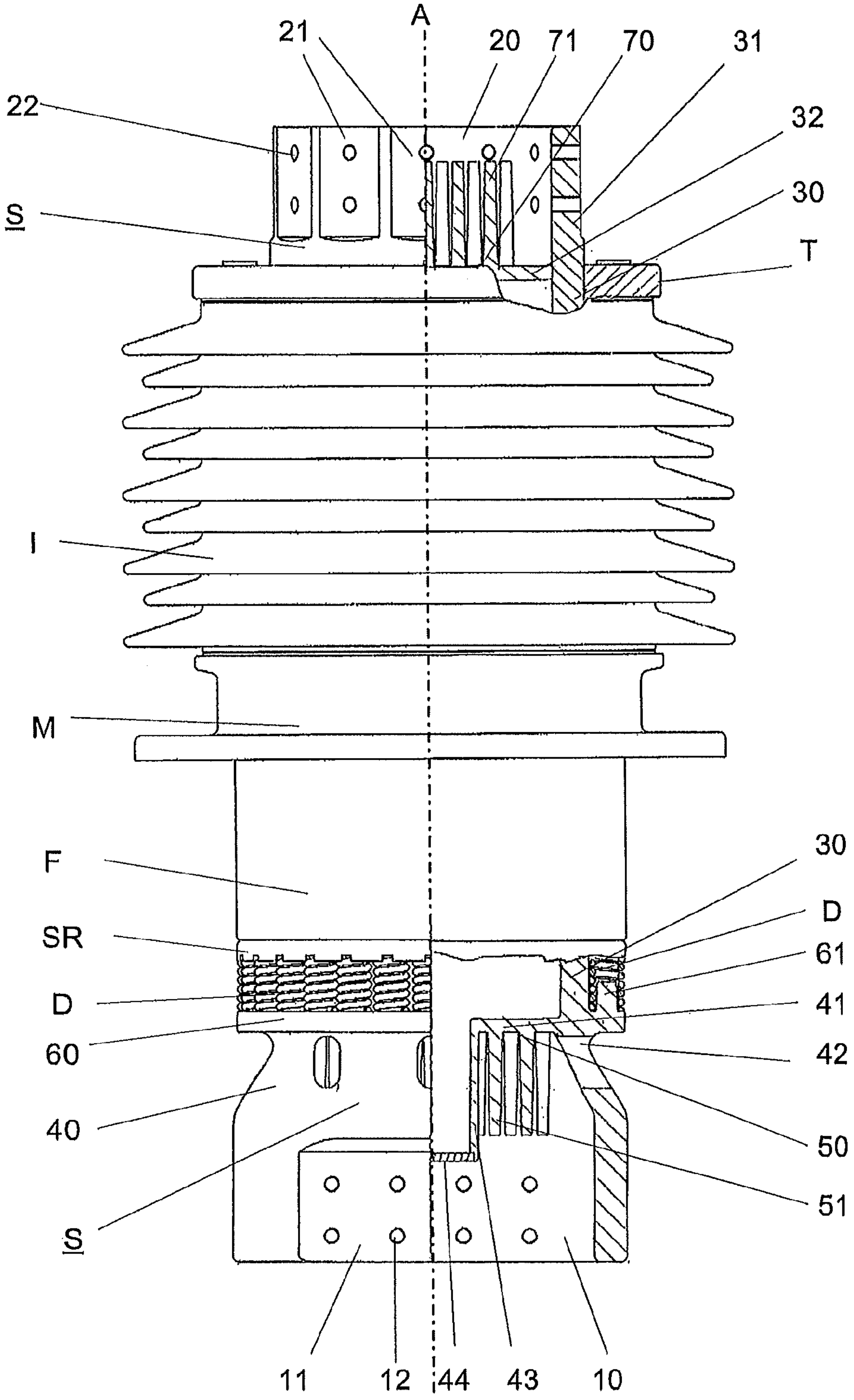
FIG. 1 shows a plan view in the radial direction of a high-current bushing which is aligned along an axis A and which has an electrical conductor according to an exemplary embodiment of the present disclosure, in which the bushing is illustrated partially sectioned along the axis in the right-hand half.

Exemplary embodiments of the present disclosure provide an electrical conductor and a high-current bushing having an electrical conductor, which achieve low electrical losses with a compact design.

In the case of the electrical conductor according to the disclosure, a first electrical connection is hollow and has a profile which is oval transversely with respect to the axis with two longitudinal faces which form the two contact surfaces, with a hollow electrical conductor section being arranged between the first electrical connection and a first end of a conductor piece. The hollow electrical conductor section connects the first electrical connection to the conductor piece and forms a smooth transition from two contact surfaces of the first electrical connection to a cylindrical envelope surface of the conductor piece. A second electrical connection is connected to a second end of the conductor piece without a joint.

According to an exemplary embodiment, the electrical conductor has only a single current-carrying part and can therefore be manufactured without any complex connection techniques directly from a suitable metal or a suitable alloy, for example based on aluminum. A current path which extends between the two electrical connections during operation of the electrical conductor has lower electrical losses than a known electrical conductor, because there are no joints. Since two electrical connections are integrated in the current path without any joint in either case, this arrangement achieves a uniform current distribution in the electrical conductor when the electrical power supplies are connected to connecting conductors in an unbalanced form or incompletely. Furthermore, because of the oval profile of the first electrical connection and the smooth transition from its two contact surfaces, which are aligned parallel to one another, to the cylindrical envelope surface of the hollow conductor piece, this on the one hand additionally reduces the electrical losses in the current path, and therefore on the other hand avoids excessively great local heating of the electrical conductor. The oval profile of the first electrical connection contains two curved pieces, which connect the two contact surfaces to one another. These curved pieces ensure that the first electrical connection has a high mechanical strength and is furthermore distinguished by a relatively large surface area which quickly emits to the exterior heat which is created as a result of the electrical losses in the electrical conductor.

In order to increase the rated current flowing in the electrical conductor during operation, it is advantageous to arrange a first cooling system in the interior of the hollow electrical conductor section. Integration of this cooling system in the electrical conductor, which is advantageous from the manufacturing point of view, can be achieved using axially aligned cooling elements which are arranged on a radially extending wall termination of the hollow electrical conductor section. At the same time, the cooling elements, which can be in the form of needles or ribs, for example, are protected against mechanical damage by the surrounding wall of the hollow electrical conductor section.

The exchange of a heated coolant, such as, for example, a transformer oil which is located in the hollow electrical conductor section and extracts heat from the first cooling system and the electrical connection, is improved if openings are formed in a wall which bounds the hollow electrical conductor section radially on the outside.

If a mounting ring which extends radially outward and has axially aligned pins is formed in the hollow electrical conductor section, then this considerably simplifies the manufacture of a high-current bushing which uses the electrical conductor.

A higher rated current load capacity is achieved for exemplary embodiments of the electrical conductor according to the present disclosure if the conductor piece is a hollow cylinder, if the second electrical connection is formed into a tubular projection of the hollow cylinder, and if the hollow cylinder and the tubular projection are separated from one another by a radially guided closure plate. Since the rated current is carried in a hollow current path which runs largely linearly and has neither joints nor edges, the electrical losses during operation of the electrical conductor are particularly greatly reduced. If a second cooling system is arranged in the interior of the tubular projection and has axially aligned cooling elements arranged on the separating wall, then the rated current can be increased even further, because of the enhanced cooling performance.

The exemplary electrical conductor according to the present disclosure and at least one of the above-mentioned apparatuses, which may be integrated in the electrical conductor, such as the first or second cooling system and the externally accessible mounting ring, may be in the form of castings. Undesirable joints can then be avoided in a particularly simple manner, and one or more of the additional apparatuses can be integrated in order to achieve functions which assist the cooling of the electrical conductor and the manufacture of a high-current bushing containing the electrical conductor.

A high-current bushing having an electrical conductor according to an exemplary embodiment of the present disclosure has a first mounting ring, which is used for mounting prestressed compression springs and is held on the electrical conductor. The electrical conductor is surrounded in a coaxial arrangement by a hollow-cylindrical field control body which is supported on the prestressed compression springs, a mounting flange which is supported on the field control body, an insulator which is supported on the mounting flange, and a mounting ring which supports the insulator and is connected to the electrical conductor with a force fit. The first mounting ring is formed into the hollow electrical conductor section and has axially aligned pins for guiding the compression springs.

A high-current bushing such as this is distinguished by low electrical losses and a correspondingly high rated current load capacity. Furthermore, the exemplary high-current bushing can be produced using a method which is suitable for mass production. In this production method, the compression springs are plugged onto the axially aligned pins, and a supporting ring is pushed onto the electrical conductor from above and is mounted on ends, which are free at the top, of the compression springs. Sealing rings, the field control body, the mounting flange, the insulator and the second mounting ring are then pushed onto the electrical conductor. A stack formed in this way is prestressed by a force acting on the second mounting ring, and the second mounting ring is connected to the electrical conductor with a force fit, while maintaining the prestressing force.

FIG. 1 illustrates an exemplary embodiment of a high-current bushing having an electrical conductor according to an exemplary embodiment of the present disclosure. The high-current bushing illustrated in FIG. 1 is largely cylindrically symmetrical along the axis A and has an electrical conductor S. The electrical conductor S is surrounded in a coaxial arrangement by a hollow-cylindrical field control body F and a hollow-cylindrical insulator I which is passed around the field control body F.

The field control body F is in the form of a supporting insulator and has a winding body, which is solidified by a cured duromer polymer, capacitively controls the electrical field in the bushing and contains an insulating film and flat metal plates which are incorporated in the insulating film and are which electrically insulated from one another. The lower end of the field control body F is seated on a supporting ring SR, which is itself held in a sprung manner on a crown, which is held on the lower part of the electrical conductor S, by prestressed compression springs D. A shoulder is formed in the envelope surface of the field control body, and the lower end surface of a mounting flange M is seated on this shoulder. A lower end surface of the insulator I, which is provided with a shield, is seated on the upper end surface of the mounting flange M. A mounting ring T is seated on the upper end surface of the insulator I and is fixed in the upper part of the electrical conductor S with the aid of an attachment element, such as a retaining ring, for example. An annular cavity is bounded on the inside by the electrical conductor S, is bounded at the top by the mounting ring T, is bounded at the bottom by the supporting ring SR and mounting flange M, and is bounded on the outside by the field control body F and the insulator I. The annular cavity is closed by seals, and is filled with an insulating encapsulating compound.

The bushing can be inserted in any desired installation position into an opening in a transformer housing, and can be attached to the housing in an air-tight and oil-tight manner by means of the mounting flange M. The lower end of the electrical conductor S is in the form of an electrical connection 10, and is electrically conductively connected to a primary winding of the transformer during the assembly of the bushing, with the aid of connecting screws, which are guided in holes 12 in the electrical connection 10. During operation of the bushing, the electrical connection 10 is located in the interior of the transformer, which is filled with insulating oil. The upper end of the electrical conductor S is in the form of an electrical connection 20 and is likewise electrically conductively connected to a phase conductor (which is in general arranged in grounded, air-filled metal encapsulation) of a generator outgoer during the assembly of the bushing with the aid of screws which are guided in holes 22 of the electrical connection 20. The bushing is designed such that it can be loaded with rated currents of up to 40 kA and with rated voltages of up to 52 kV during operation, for example.

Figure 2:
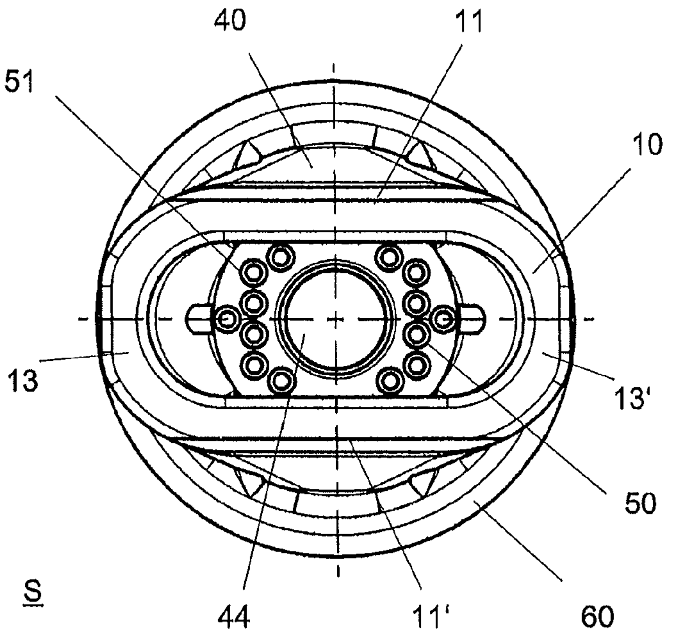
FIG. 2 shows a view from underneath of the exemplary electrical conductor of the bushing shown in FIG. 1.

The electrical conductor S is formed by an electrically conductive casting which can be composed of an aluminum alloy which can be cast, for example. In addition to the two electrical connections 10 and 20, the casting has a conductor piece which is in the form of a hollow cylinder 30, extends along the axis A and has a cylindrical envelope surface. The electrical connection 10 has two contact surfaces 11, 11' (as can be seen from FIG. 2) which are aligned parallel to one another, and of which a part of the contact surface 11 is illustrated in FIG. 1. The two electrical connections 10, 20 are hollow. As can be seen from FIG. 2, the electrical connection 10 has an oval profile at right angles to the axis A, with two longitudinal faces which form the two contact surfaces 11, 11'. A hollow electrical conductor section 40 is arranged between the electrical connection 10 and the lower end of the conductor piece 30. This section connects the electrical connection 10 to the conductor piece 30 and forms a smooth transition from the two contact surfaces 11, 11' to the cylindrical envelope surface of the conductor piece 30. The hollow electrical connections 10, 20 and the hollow electrical section 40 ensure that the electrical conductor S is optimized for suppression of eddy currents and the skin effect not only in the conductor piece 30 which is in the form of a hollow cylinder but also in its end areas.

Because it is in the form of a casting, the electrical conductor 1 has no joints in a current path which extends between the two electrical connections 10, 20. A joint is otherwise created when the electrical conductor is manufactured from two or more components. In this case, the two components are joined together at joining surfaces, forming a joint, and are then integrally connected to one another by filing the joint, for example with metal during welding or soldering. Electrical losses which occur during operation of the bushing, and heating of the bushing associated with these losses, are therefore less than in the case of a known bushing of comparable dimensions and with a comparable load, which has an electrical conductor with at least one joint. Because of the oval profile of the electrical connection 10 and because of the smooth transition, which is kept free of edges and abrupt direction changes, which are generally known to be 90°, from the two contact surfaces 11, 11', which are aligned parallel to one another, to the cylindrical envelope surface of the hollow conductor piece 30, the electrical losses in the current path are additionally reduced, and local heating which would otherwise be present as a result of increased power losses and discontinuities is largely avoided.

The oval profile of the electrical connection 10 has two curved pieces 13, 13' (see FIG. 2), which can connect the two contact surfaces 11, 11' to one another. These curved pieces 13, 13' result in the electrical connection 10 having high mechanical strength. Furthermore, the two curved pieces 13, 13' increase the surface area of the electrical connection 10 and thus ensure that heat created as a consequence of electrical losses in the electrical conductor S is quickly emitted to the surrounding transformer oil.

The hollow electrical conductor section 40, which is arranged in the transformer oil, holds a cooling system 50. The cooling system 50 is integrated in a radially extending wall termination 41 of the hollow electrical conductor section 40, and has cooling elements 51 in the form of needles or ribs, for example. The hollow electrical conductor section 40 is bounded radially on the outside by a wall in which openings 42 are formed. The openings 42 ensure that transformer oil which has been heated by absorption of heat losses in the cooling system 50 flows radially outwards out of the interior of the section 40 and of the electrical connection 10, and can quickly be replaced by cool oil flowing in axially.

An externally accessible mounting ring 60 with axially aligned pins 61 is formed into the hollow electrical conductor section 40. The compression springs D, which produce the prestressing, are mounted such that they can be pushed onto the axially aligned pins 61 in the axial direction.

Figure 3:
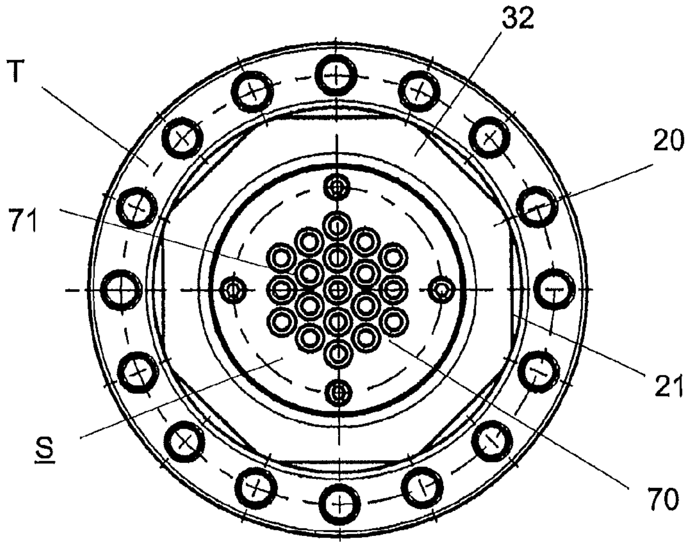
FIG. 3 shows a plan view of the exemplary electrical conductor of the bushing shown in FIG. 1.

The electrical connection 20 which can be seen in FIGS. 1 and 3 is formed into a tubular projection 31 of the hollow cylinder 30 and has a plurality of contact surfaces 21 (e.g., eight), which are arranged in the form of a regular polyhedron. The hollow cylinder 30 and tubular projection 31, as well as the electrical connection 20, are separated from one another by a radially guided closure plate 32, in which a cooling system 70 can be integrated. The cooling system 70 can be optionally arranged in the interior of the air-filled tubular projection 31. The cooling system 70 has axially aligned cooling elements 71, which are in the form of needles or ribs, for example, and, similar to the cooing system 50, increases the rated load current capacity of the bushing by additional cooling of the electrical conductor S.

In order to manufacture the electrical conductor S, a casting core, which is held on a rod and governs the internal contours of the tubular projection 31, of the hollow cylinder 30 and of the wall termination 41, is arranged in a two-part casting mold. The casting mold determines the external contours of the tubular projection 31, as well as the electrical connection 20 and the hollow cylinder 30, as well as the internal and external contours of the hollow electrical connection 10 and of the hollow electrical conductor section 40, including the mounting ring 60, which contains the bearing pins 61, and the cooling system 50. The closed casting mold is filled with a melt of an aluminum alloy, and the electrical conductor S is obtained in the form of a casting after cooling down and removal from the mold. Because of the rod which holds the casting core, the casting has an opening which is arranged centrally in the wall termination 41 and is bounded by a tubular connecting stub 43 which extends axially downward. In order to prevent the ingress of oil into the interior of the hollow cylinder 30, the tubular connecting stub is closed by a plate 44 which is guided at right angles to the axis A. In a corresponding manner, the ingress of air into the cavity in the electrical conductor S bounded by the hollow cylinder 30 is prevented by the wall 32, which is guided at substantially right angles to the axis A.

In order to comply with specific specifications placed on the electrical conductor, the casting may be reworked by machining if required. The contact surfaces 11, 11', 21 can be formed by milling, for example, and the openings provided for guiding the connecting screws, as well as the openings 42, can be formed by drilling, for example.

During the manufacture of the high-voltage bushing, the compression springs D are first of all plugged onto the axially aligned pins 61, and the supporting ring SR is pushed onto the electrical conductor S from above, and is mounted on ends, which are free at the top, of the compression springs. Sealing rings, the field control body F, the mounting flange N, the insulator I and the mounting ring T are then pushed onto the electrical conductor S. A stack formed in this way is compressed by a force acting on the mounting ring T, forming the prestressing force, and the mounting ring T is fixed to the electrical conductor S with a force fit with the aid of the attachment element (e.g., a retaining ring), with the prestressing force being maintained.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Electrical connection
11, 11' Contact surfaces
12 Openings
13, 13' Curved pieces
20 Electrical connection
21 Contact surfaces
22 Openings
30 Conductor piece, hollow cylinder
31 Tubular projection
32 Closure plate
40 Electrical conductor section
41 Wall termination
42 Openings
43 Tubular connecting stub
44 Closure plate
50 Cooling system
51 Cooling elements
60 Mounting ring
61 Pin, guide elements
70 Cooling system
71 Cooling elements
A Axis
D Compression springs
F Field control body
I Insulator
M Mounting flange
S Electrical conductor
SR Supporting ring
T Mounting ring

What is claimed is:

1. A metal conductor for a high-current bushing, the metal electrical conductor comprising:

a conductor piece having a first end and a second end, and extending along an axis, the conductor piece comprising a circular, cylindrical envelope surface, a first electrical connection being connected without a joint to the first end of the conductor piece and having two contact surfaces which are aligned parallel to one another, and a second electrical connection being connected without a joint to the second end of the conductor piece, wherein the first electrical connection is hollow and, at right angles to the axis, has an oval profile with two longitudinal faces which form the two contact surfaces, and wherein the metal electrical conductor further comprises a hollow electrical conductor section which is arranged between the first electrical connection and the first end of the conductor piece, connects the first electrical connection to the conductor piece, and forms a smooth transition from the two contact surfaces of the first electrical connection to the envelope surface of the conductor piece.

2. The electrical conductor as claimed in claim 1, comprising a first cooling system arranged in an interior region of the hollow electrical conductor section.

3. The electrical conductor as claimed in claim 2, wherein the hollow electrical conductor section comprises a radially extending wall termination, and the first cooling system comprises axially aligned cooling elements which are arranged on the radially extending wall termination of the hollow electrical conductor section.

4. The electrical conductor as claimed in claim 3, comprising a wall which bounds the hollow electrical conductor section radially on the outside, and openings formed in the wall.

5. The electrical conductor as claimed in claim 3, comprising a mounting ring formed in the hollow electrical conductor section, the mounting ring extending radially outward and having axially aligned pins.

6. The electrical conductor as claimed in claim 3, wherein:
the conductor piece is a hollow cylinder,
the second electrical connection is formed into a tubular projection of the hollow cylinder, and
the hollow cylinder and the tubular projection are separated from one another by a radially guided closure plate.

7. A high-current bushing having an electrical conductor as claimed in claim 3, the high-current bushing comprising:
a first mounting ring, which constitutes a holder for prestressed compression springs and is held on the electrical conductor to surround the electrical conductor in a coaxial arrangement by a hollow-cylindrical field control body, which is supported on the prestressed compression springs;
a mounting flange which is supported on the field control body;
an insulator which is supported on the mounting flange; and
a mounting ring which supports the insulator and is connected to the electrical conductor with a force fit,
wherein the first mounting ring is formed into the hollow electrical conductor section and has axially aligned pins for guiding the compression springs.

8. The electrical conductor as claimed in claim 2, comprising a wall which bounds the hollow electrical conductor section radially on the outside, and openings formed in the wall.

9. The electrical conductor as claimed in claim 2, comprising a mounting ring formed in the hollow electrical conductor section, the mounting ring extending radially outward and having axially aligned pins.

10. The electrical conductor as claimed in claim 2, wherein:
the conductor piece is a hollow cylinder,
the second electrical connection is formed into a tubular projection of the hollow cylinder, and
the hollow cylinder and the tubular projection are separated from one another by a radially guided closure plate.

11. A high-current bushing having an electrical conductor as claimed in claim 2, the high-current bushing comprising:
a first mounting ring, which constitutes a holder for prestressed compression springs and is held on the electrical conductor to surround the electrical conductor in a coaxial arrangement by a hollow-cylindrical field control body, which is supported on the prestressed compression springs;
a mounting flange which is supported on the field control body;
an insulator which is supported on the mounting flange; and
a mounting ring which supports the insulator and is connected to the electrical conductor with a force fit,
wherein the first mounting ring is formed into the hollow electrical conductor section and has axially aligned pins for guiding the compression springs.

12. The electrical conductor as claimed in claim 1, comprising a wall which bounds the hollow electrical conductor section radially on the outside, and openings formed in the wall.

13. The electrical conductor as claimed in claim 12, comprising a mounting ring formed in the hollow electrical conductor section, the mounting ring extending radially outward and having axially aligned pins.

14. The electrical conductor as claimed in claim 12, wherein:
the conductor piece is a hollow cylinder,
the second electrical connection is formed into a tubular projection of the hollow cylinder, and
the hollow cylinder and the tubular projection are separated from one another by a radially guided closure plate.

15. A high-current bushing having an electrical conductor as claimed in claim 12, the high-current bushing comprising:
a first mounting ring, which constitutes a holder for prestressed compression springs and is held on the electrical conductor to surround the electrical conductor in a coaxial arrangement by a hollow-cylindrical field control body, which is supported on the prestressed compression springs;
a mounting flange which is supported on the field control body;
an insulator which is supported on the mounting flange; and
a mounting ring which supports the insulator and is connected to the electrical conductor with a force fit,
wherein the first mounting ring is formed into the hollow electrical conductor section and has axially aligned pins for guiding the compression springs.

16. The electrical conductor as claimed in claim 1, comprising a mounting ring formed in the hollow electrical conductor section, the mounting ring extending radially outward and having axially aligned pins.

17. The electrical conductor as claimed in claim 16, wherein:
the conductor piece is a hollow cylinder,
the second electrical connection is formed into a tubular projection of the hollow cylinder, and
the hollow cylinder and the tubular projection are separated from one another by a radially guided closure plate.

18. The electrical conductor as claimed in claim 1, wherein:
the conductor piece is a hollow cylinder,
the second electrical connection is formed into a tubular projection of the hollow cylinder, and
the hollow cylinder and the tubular projection are separated from one another by a radially guided closure plate.

19. The electrical conductor as claimed in claim 18, comprising a cooling system arranged in an interior region of the tubular projection, the cooling system being attached to the closure plate and having axially aligned cooling elements.

20. A high-current bushing having an electrical conductor as claimed in claim 19, the high-current bushing comprising:
a first mounting ring, which constitutes a holder for prestressed compression springs and is held on the electrical conductor to surround the electrical conductor in a coaxial arrangement by a hollow-cylindrical field control body, which is supported on the prestressed compression springs;
a mounting flange which is supported on the field control body;
an insulator which is supported on the mounting flange; and
a mounting ring which supports the insulator and is connected to the electrical conductor with a force fit,
wherein the first mounting ring is formed into the hollow electrical conductor section and has axially aligned pins for guiding the compression springs.

21. A high-current bushing having an electrical conductor as claimed in claim 18, the high-current bushing comprising:
a first mounting ring, which constitutes a holder for prestressed compression springs and is held on the electrical conductor to surround the electrical conductor in a coaxial arrangement by a hollow-cylindrical field control body, which is supported on the prestressed compression springs;

a mounting flange which is supported on the field control body;

an insulator which is supported on the mounting flange; and a mounting ring which supports the insulator and is connected to the electrical conductor with a force fit, wherein the first mounting ring is formed into the hollow electrical conductor section and has axially aligned pins for guiding the compression springs.

22. The electrical conductor as claimed in claim 1, wherein the electrical conductor is a casting.

23. A high-current bushing having an electrical conductor as claimed in claim 22, the high-current bushing comprising:

a first mounting ring, which constitutes a holder for prestressed compression springs and is held on the electrical conductor to surround the electrical conductor in a coaxial arrangement by a hollow-cylindrical field control body, which is supported on the prestressed compression springs;

a mounting flange which is supported on the field control body;

an insulator which is supported on the mounting flange; and a mounting ring which supports the insulator and is connected to the electrical conductor with a force fit, wherein the first mounting ring is formed into the hollow electrical conductor section and has axially aligned pins for guiding the compression springs.

24. A high-current bushing having an electrical conductor as claimed in claim 1, the high-current bushing comprising:

a first mounting ring, which constitutes a holder for prestressed compression springs and is held on the electrical conductor to surround the electrical conductor in a coaxial arrangement by a hollow-cylindrical field control body, which is supported on the prestressed compression springs;

a mounting flange which is supported on the field control body;

an insulator which is supported on the mounting flange; and a mounting ring which supports the insulator and is connected to the electrical conductor with a force fit, wherein the first mounting ring is formed into the hollow electrical conductor section and has axially aligned pins for guiding the compression springs.

25. The electrical conductor as claimed in claim 1, wherein the metal electrical conductor is casted.

26. A method for producing a high-current bushing having a metal electrical conductor, wherein the metal electrical conductor includes a conductor piece having a first end and a second end, and extending along an axis, the conductor piece including (i) a circular, cylindrical envelope surface, (ii) a first electrical connection being connected without a joint to the first end of the conductor piece and having two contact surfaces which are aligned parallel to one another, and (iii) a second electrical connection being connected without a joint to the second end of the conductor piece, wherein the first electrical connection is hollow and, at right angles to the axis, has an oval profile with two longitudinal faces which form the two contact surfaces, and wherein the metal electrical conductor includes a hollow electrical conductor section which is arranged between the first electrical connection and the first end of the conductor piece, connects the first electrical connection to the conductor piece, and forms a smooth transition from the two contact surfaces of the first electrical connection to the envelope surface of the conductor piece, wherein the high-current bushing includes (i) a first mounting ring, which constitutes a holder for prestressed compression springs and is held on the metal electrical conductor to surround the metal electrical conductor in a coaxial arrangement by a hollow-cylindrical field control body, which is supported on the prestressed compression springs, (ii) a mounting flange which is supported on the field control body, (iii) an insulator which is supported on the mounting flange, and (iv) a mounting ring which supports the insulator and is connected to the metal electrical conductor with a force fit, the mounting ring being formed into the hollow electrical conductor section and has axially aligned pins for guiding the compression springs, and wherein the method comprises:

plugging the compression springs onto the axially aligned pins, so that a supporting ring is pushed onto the metal electrical conductor from above and is mounted on ends, which are free at the top, of the compression springs, pushing the sealing rings, the field control body, the mounting flange, the insulator and the second mounting ring are pushed onto the metal electrical conductor; and forming a stack by prestressing a force acting on the second mounting ring; and connecting the second mounting ring to the metal electrical conductor with a force fit, while maintaining the prestressing force.

27. The method as claimed in claim in claim 26, wherein the metal electrical conductor is casted.

* * * * *